United States Patent
Roeder et al.

(10) Patent No.: US 11,403,854 B2
(45) Date of Patent: Aug. 2, 2022

(54) OPERATING ASSISTANCE METHOD, CONTROL UNIT, OPERATING ASSISTANCE SYSTEM AND WORKING DEVICE

(71) Applicant: Robert Bosch GmbH, Stuttgart (DE)

(72) Inventors: Jens Roeder, Stuttgart (DE); Michael Kessler, Leonberg (DE); Patrick Koegel, Ludwigsburg (DE); Steffen Brueggert, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 16/977,803

(22) PCT Filed: Apr. 11, 2019

(86) PCT No.: PCT/EP2019/059280
§ 371 (c)(1),
(2) Date: Sep. 2, 2020

(87) PCT Pub. No.: WO2019/223933
PCT Pub. Date: Nov. 28, 2019

(65) Prior Publication Data
US 2020/0401821 A1    Dec. 24, 2020

(30) Foreign Application Priority Data
May 25, 2018   (DE) .......................... 102018208278.2

(51) Int. Cl.
*G06V 20/00* (2022.01)
*B60Q 1/52* (2006.01)
(Continued)

(52) U.S. Cl.
CPC ............ *G06V 20/58* (2022.01); *B60Q 1/525* (2013.01); *G06T 7/70* (2017.01); *G06V 40/103* (2022.01);
(Continued)

(58) Field of Classification Search
None
See application file for complete search history.

(56) References Cited

U.S. PATENT DOCUMENTS

| 2005/0131646 A1 | 6/2005 | Camus |
| 2012/0140076 A1 | 6/2012 | Rosenbaum et al. |

(Continued)

FOREIGN PATENT DOCUMENTS

| JP | 2001028050 A | 1/2001 |
| JP | 2008113296 A | 5/2008 |

(Continued)

OTHER PUBLICATIONS

International Search Report for PCT/EP2019/059280, dated Jul. 25, 2019.

(Continued)

*Primary Examiner* — Matthew C Bella
*Assistant Examiner* — Brian D Shin
(74) *Attorney, Agent, or Firm* — Norton Rose Fulbright US LLP; Gerard Messina

(57) ABSTRACT

An operating assistance method for a working device or for a vehicle. Object boxes for an object in a field of view of the working device are obtained at consecutive times. From object boxes of a given object, for images recorded in succession or direct succession, an instantaneous change of scale of an object box for the specific object, and an instantaneous lateral change of position of the object box for the specific object, are determined. An object box predicted in the future is determined from the current change of scale, and from the instantaneous lateral change in position for an object box for a specific object. The position of the predicted object box and/or the ratio of a lateral extension of the (Continued)

predicted object box to a lateral extension of a covered field of view and/or of the recorded images are determined and evaluated.

16 Claims, 6 Drawing Sheets

(51) Int. Cl.
| | | |
|---|---|---|
| *G06T 7/70* | (2017.01) | |
| *G06V 40/00* | (2022.01) | |
| *G06V 20/58* | (2022.01) | |
| *B60Q 1/50* | (2006.01) | |
| *G06V 40/10* | (2022.01) | |
| *G08G 1/16* | (2006.01) | |

(52) U.S. Cl.
CPC .............. *G06T 2207/30196* (2013.01); *G06T 2207/30261* (2013.01); *G08G 1/166* (2013.01)

(56) References Cited

U.S. PATENT DOCUMENTS

| | | | |
|---|---|---|---|
| 2012/0148093 A1* | 6/2012 | Sharma | G06T 7/194 |
| | | | 382/103 |
| 2018/0107883 A1 | 4/2018 | Viswanath et al. | |
| 2020/0159222 A1* | 5/2020 | Mao | G05D 1/101 |

FOREIGN PATENT DOCUMENTS

| | | |
|---|---|---|
| JP | 2008186170 A | 8/2008 |
| JP | 2010152873 A | 7/2010 |
| JP | 2013097480 A | 5/2013 |
| JP | 2013210942 A | 10/2013 |
| JP | 2017138660 A | 8/2017 |
| WO | 2015152304 A1 | 10/2015 |
| WO | 2016014548 A1 | 1/2016 |

OTHER PUBLICATIONS

Keller Christoph G et al., "Will the Pedestrian Cross? A Study On Pedestrian Path Prediction," IEEE Transactions On Intelligent Transportation Systems, IEEE, vol. 15, No. 2, 2014, pp. 494-506. XP011544920.

Junfeng GE et al., "Real-Time Pedestrian Detection and Tracking At Nighttime for Driver-Assistance Systems," IEEE Transactions On Intelligent Transportation Systems, IEEE, vol. 10, No. 2, 2009, pp. 283-298. XP011347179.

* cited by examiner

OPERATING ASSISTANCE METHOD, CONTROL UNIT, OPERATING ASSISTANCE SYSTEM AND WORKING DEVICE

FIELD

The present invention relates to an operating assistance system for a working device or for a vehicle, a control unit for an operating assistance system of a working device, an operating assistance system as such, as well as a working device and, in particular, a vehicle.

BACKGROUND INFORMATION

In the case of working devices and, in particular, in the automotive branch, operating assistance systems and methods are being used more and more; the operating assistance systems and methods being intended for checking the surroundings of the specific device with regard to possible collisions with objects, and for outputting appropriate warning signals and/or intervening in the operation of the device. In conventional systems and methods, comparatively complex systems and data structures, for example, including the evaluation of three-dimensional data, are used, and/or the meaningfulness of the corresponding evaluations of the surroundings is not sufficient for intervention in the operation of the device, for example, for a braking decision.

SUMMARY

An operating assistance method according to an example embodiment of the present invention may have the advantage that, for the operation of a working device, a particularly reliable collision prediction may be generated, using comparatively simple devices. According to the example embodiment of the present invention, this is accomplished in that an operating assistance method for a working device and, in particular, for a vehicle, are provided, where
(S1) object boxes for an object in a field of view of the working device, or data characterizing such object boxes, are obtained for consecutive times;
(S2) from object boxes of a given object, for images recorded in succession or direct succession, an instantaneous change of scaling or change of scale of an object box for the specific object, and an instantaneous lateral change of position of the object box for the specific object, are determined;
(S3) an object box predicted in the future is determined from the instantaneous change of scaling, change of scale or variables derived from them, and from the instantaneous lateral change in position for an object box for a specific object; and
(S4) the position of the predicted object box and/or the ratio of a lateral extension of the predicted object box to a lateral extension of a covered field of view and/or of the recorded images are determined and evaluated; and
(S5) as a function of the result of the evaluation (i), it is determined whether or not an object forming the basis of the predicted object box is critical with regard to a possible collision, and/or (ii) an operating state of the working device is being controlled or regulated.

Thus, according to the example embodiment of the present invention, it is provided that the evaluation of the surroundings of the working device be based on so-called object boxes and correspondingly predicted object boxes and the evolution of their size in relation to a covered field of view. These data may generally be acquired two-dimensionally and determined at a high accuracy.

Preferred further refinements of the present invention are described herein.

The data connected with the object boxes may be provided externally, for example, by optical detection units of conventional driving assistance systems.

However, in one preferred specific embodiment of the operating assistance method according to the present invention, in step (S1), or for the step (S1), of obtaining the object boxes and/or the data characterizing the object boxes, it is provided that
(S1a) a field of view of the underlying working device be covered optically two-dimensionally and/or monocularly, while images are recorded temporally consecutively; and
(S1b) in consecutive, recorded images or sections of them, at least one object and an object box associated with the object be determined.

As was already mentioned above, a definitive aspect of the present invention is the prediction, in the future, of an acquired object box for an object in the field of view. Such a prediction may be carried out in different ways.

In one exemplary embodiment of the operating assistance method according to the present invention, an object box predicted in the future is determined for an image currently recorded last or for a section of it.

In particular, this takes place in that, over a plurality of time increments up to a prediction time span, values for the scaling, or variables derived from it, of a specific object box, for the coordinates of a specific object box, for the translation of a specific object box, and/or for the lateral width of a specific object box, are determined and updated iteratively.

The prediction time span and/or the time increments may be predetermined and set. However, the prediction time span and/or the time increments may also be made a function of further operating parameters, for example, an independent speed and/or a position of the device and, in particular, of the vehicle itself, or also of a previously predicted speed and/or position of one or more objects in the surroundings of the device, in particular, of the vehicle. Thus, the monitoring may take place temporally closely meshed in an advantageous manner, if this is necessary due to the number of objects located in the surroundings and/or due to a comparatively high, independent speed of the device and/or of the objects. On the other hand, the monitoring expenditure may be lowered in response to comparatively low traffic or similar situations.

In this connection, according to another embodiment of the operating assistance method of the present invention, the following steps may be executed for each time increment, in particular, in the indicated order:
(I1) Resetting or presetting the values to be calculated, in accordance with the assignment rules $$\text{Scaling}_{old} := \text{Scaling}_{new}$$

$$\text{BoxTranslation}X_{old} := \text{BoxTranslation}X_{new}$$

$$\text{BoxWidth}_{old} := \text{BoxWidth}_{new}$$

$$\text{LeftBoxPosition}_{old} := \text{LeftBoxPosition}_{new}$$

$$\text{RightBoxPosition}_{old} := \text{RightBoxPosition}_{new};$$

(I2) Updating the scaling in accordance with the following assignment rule $$\text{Scaling}_{new} := 1/(2-\text{Scaling}_{old})$$

(I3) Updating the horizontal or lateral object box translation in accordance with the following assignment rule $$\text{BoxTranslationX}_{new} := \text{BoxTranslationX}_{old} \times \text{Scaling}_{old}$$

(I4) Updating the horizontal or lateral object box width in accordance with the following assignment rule $$\text{BoxWidth}_{new} := \text{RightBoxPosition}_{old} - \text{LeftBoxPosition}_{old}$$

(I5) Predicting the horizontal or lateral box positions in accordance with the following assignment rules $$\text{LeftBoxPosition}_{new} := \text{LeftBoxPosition}_{old} + \text{BoxTranslationX}_{new} - 0.5 \times \text{BoxWidth}_{new} \times (\text{Scaling}_{new}-1)/\text{Scaling}_{new}$$

$$\text{RightBoxPosition}_{new} := \text{RightBoxPosition}_{old} + \text{BoxTranslationX}_{new} + 0.5 \times \text{BoxWidth}_{new} \times (\text{Scaling}_{new}-1)/\text{Scaling}_{new};$$

where $\text{Scaling}_{old}$, $\text{Scaling}_{new}$ designate the old and new scaling, or their values, respectively, of an object box; $\text{BoxTranslationX}_{old}$, $\text{BoxTranslationX}_{new}$ designate the old and new displacement, or their values, respectively, of an object box; $\text{BoxWidth}_{old}$, $\text{BoxWidth}_{new}$ designate the old and new width, or their values, respectively, of an object box; $\text{LeftBoxPosition}_{old}$, $\text{LeftBoxPosition}_{new}$ designate the old and new position, or their values, respectively, of the lower left corner of an object box (52) in the form of a first x-coordinate of the specific object box; and $\text{RightBoxPosition}_{old}$, $\text{RightBoxPosition}_{new}$ designate the old and the new position, or their values, respectively, of the lower right corner of an object box in the form of a second x-coordinate of the specific object box.

Alternatively, or in addition, the above-mentioned equations may be replaced or supplemented by the following computational rules $$\text{LeftBoxPosition}_{new} := (\text{LeftBoxPosition}_{current} + \text{LeftBoxSpeed}_{current} * T_{Prediction})/(1 + \text{NormSpeed}_{current} * T_{Prediction})$$

and $$\text{RightBoxPosition}_{new} := (\text{RightBoxPosition}_{current} + \text{RightBoxSpeed}_{current} * T_{Prediction})/(1 + \text{NormSpeed}_{current} * T_{Prediction});$$

where $\text{LeftBoxPosition}_{new}$ and $\text{LeftBoxPosition}_{current}$ and $\text{RightBoxPosition}_{new}$ and $\text{RightBoxPosition}_{current}$ are the new and current positions, respectively, of the left and right box edges, respectively; $\text{LeftBoxSpeed}_{current}$ and $\text{RightBoxSpeed}_{current}$ are the currently measured angular speeds of the left and right box edges, respectively; $\text{NormSpeed}_{current}$ is the currently measured, so-called normalized box speed; and $T_{Prediction}$ is the prediction time belonging to the prediction time step. The $\text{NormSpeed}_{current}$ is derived, in particular, from the calculated scaling change of the object box.

In one specific embodiment of the operating assistance method according to the present invention, an object forming the basis of a predicted object box is determined to be critical with regard to a possible collision, in particular, to have a value of criticality of 100%, if the portion of the width of the predicted object box for the object at the width of an underlying image or a predefined section of it exceeds a predetermined, first threshold value. The threshold must be applied to each vehicle model and/or must be reapplied for each.

In this connection, it is particularly advantageous if the value of criticality determined for an object is reduced by the portion, by which the object box predicted for the object is positioned, in its width, outside of the underlying image or the predefined section of it.

Alternatively, or in addition, it is advantageous that an object forming the basis of a predicted object box is determined to be uncritical with regard to a possible collision, in particular, to have a value of criticality of 0%, if the predicted object box lies completely outside of the underlying image or the predefined section.

In order to consider as realistic a scenario as possible in the prediction of the object boxes in the future, according to another advantageous further refinement of the operating assistance method of the present invention, a pedestrian is detected as an object, a position and movement of the pedestrian in the form of an object is checked and evaluated on the basis of a pedestrian model, an ability of the pedestrian in the form of an object to accelerate is determined on the basis of a speed ascertained for the pedestrian, and the criticality for the pedestrian in the form of an object is determined on the basis of the speed and the ability to accelerate.

In this context, it is particularly advantageous if an expanded, predicted object box enveloping the predicted object box or at least laterally or horizontally surrounding it is generated and taken as a basis during the evaluation of the criticality.

According to a further aspect of the present invention, a control unit for an operating assistance system of a working device and, in particular, of a vehicle, is also provided.

The control unit of the present invention is configured to control an operating assistance method of the present invention and to allow it to execute and/or configured to operate an underlying operating assistance system in accordance with an operating assistance method of the present invention.

In addition, an operating assistance system for a working device and, in particular, for a vehicle as such, is also subject matter of the present invention. The operating assistance system is configured to execute an operating assistance method of the present invention. To that end, the operating assistance system includes, in particular, a control unit built in accordance with the present invention.

Furthermore, the present invention also provides a working device, which includes an operating assistance system according to the present invention.

The working device takes the form of, in particular, a vehicle, motor vehicle or passenger car.

According to a further aspect of the present invention, the use of the operating assistance method of the present invention, of the control unit of the present invention, of the operating assistance system of the present invention and/or of the working devices of the present invention, for pedestrian protection, for cyclist protection, for ACC and/or for avoidance systems or methods is also provided.

BRIEF DESCRIPTION OF THE DRAWINGS

Specific example embodiments of the present invention are described in detail with reference to the figures.

DETAILED DESCRIPTION OF EXAMPLE EMBODIMENTS

Figure 1:
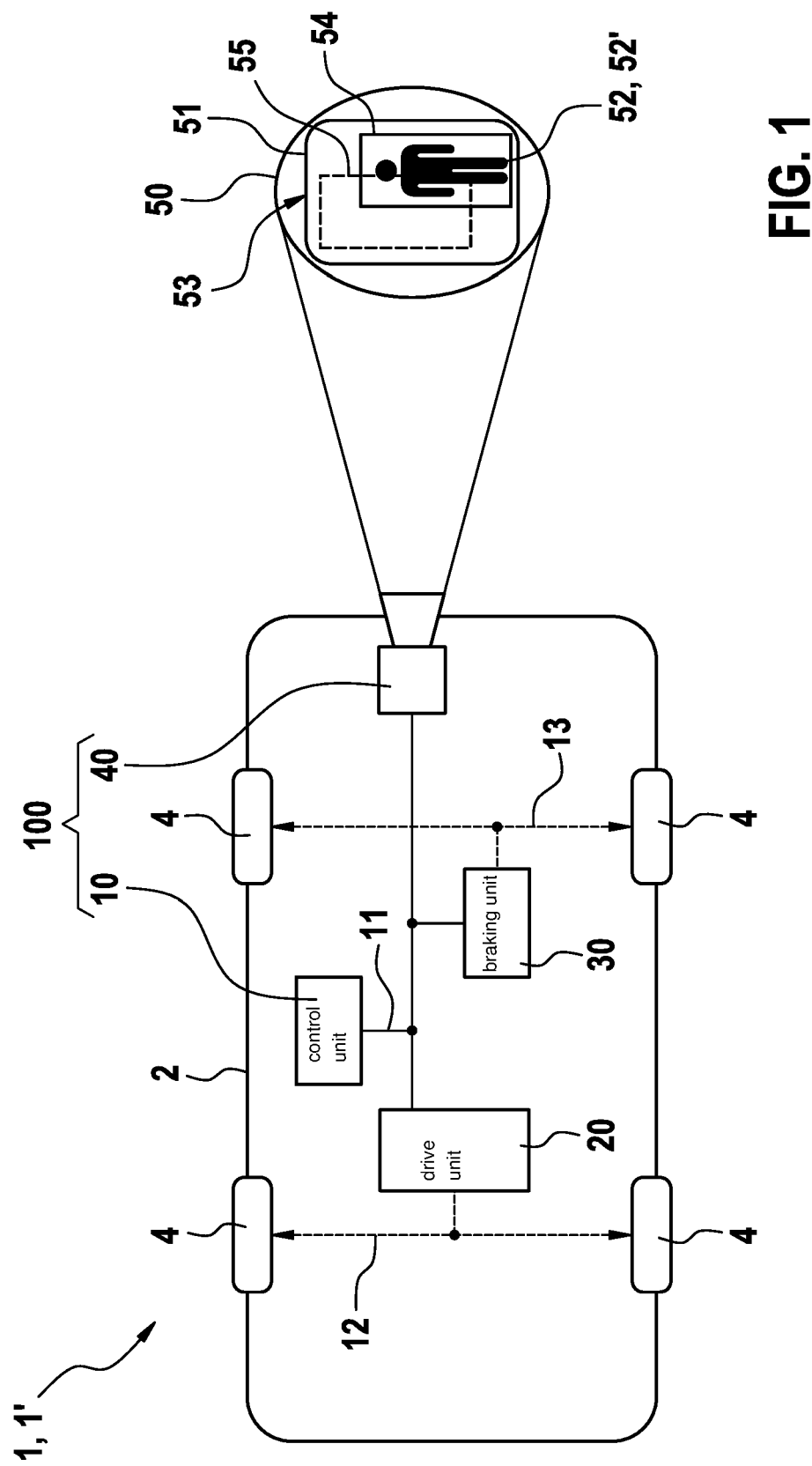
FIG. 1 shows a schematic plan view of a working device of the present invention, in the form of a vehicle, in which a specific example embodiment of the operating assistance method of the present invention may be used.

Below, exemplary embodiments of the present invention and the technical background are described in detail with reference to FIGS. 1 through 6. Identical and equivalent elements and components, as well as elements and components functioning in the same or in an equivalent manner, are denoted by the same reference numerals. The detailed description of the denoted elements and components is not repeated in each case of their appearance.

The depicted features and further characteristics may be isolated from each other and combined with each other, as desired, without departing from the essence of the present invention.

FIG. 1 shows a schematic plan view of a working device 1 of the present invention, in the form of a vehicle 1', in which a specific embodiment of the operating assistance method S of the present invention may be used.

According to an example embodiment of the present invention, vehicle 1' of the present invention is made up of a body 2, to which wheels 4 are mounted that may be driven by a drive unit 20 with the aid of a power train 12 and may be braked and/or steered by a steering and braking unit 30 via a corresponding brake and/or steering line 13.

In addition, an embodiment of operating assistance system 100 according to the present invention is part of vehicle 1' of the present invention in the form of a working device 1 in the spirit of the present invention. Operating assistance system 100 is made up of a camera unit 40 for monocularly imaging a field of view 50 from the surroundings of vehicle 1'. Field of view 50 contains a scene 53 including a pedestrian 52' as an object 52.

Using a control and detection line 11, control unit 10 is connected, on one side, to camera unit 40 and, on the other side, to drive unit 20 and braking and/or steering unit 30 for the purpose of control.

In the specific example embodiment shown in FIG. 1, images 51 of scene 53 from field of view 50 recorded by camera unit 40 are transmitted via control and detection line 11 into control unit 10, and there, they are evaluated in connection with the operating assistance method S according to the present invention.

Thus, according to the present invention, an object box 54 is ascertained in each image or frame 51 in connection with the pedestrian 52' in the form of an object 52, and from object boxes for temporally directly consecutive images 51, parameters for positional changes and scaling changes, for angular speeds of the box edges and/or variables of object boxes 54 derived from them are ascertained and form the basis of a prediction for assigning a predicted box 55 to object 52 on the basis of an interactive method I.

Figure 2:
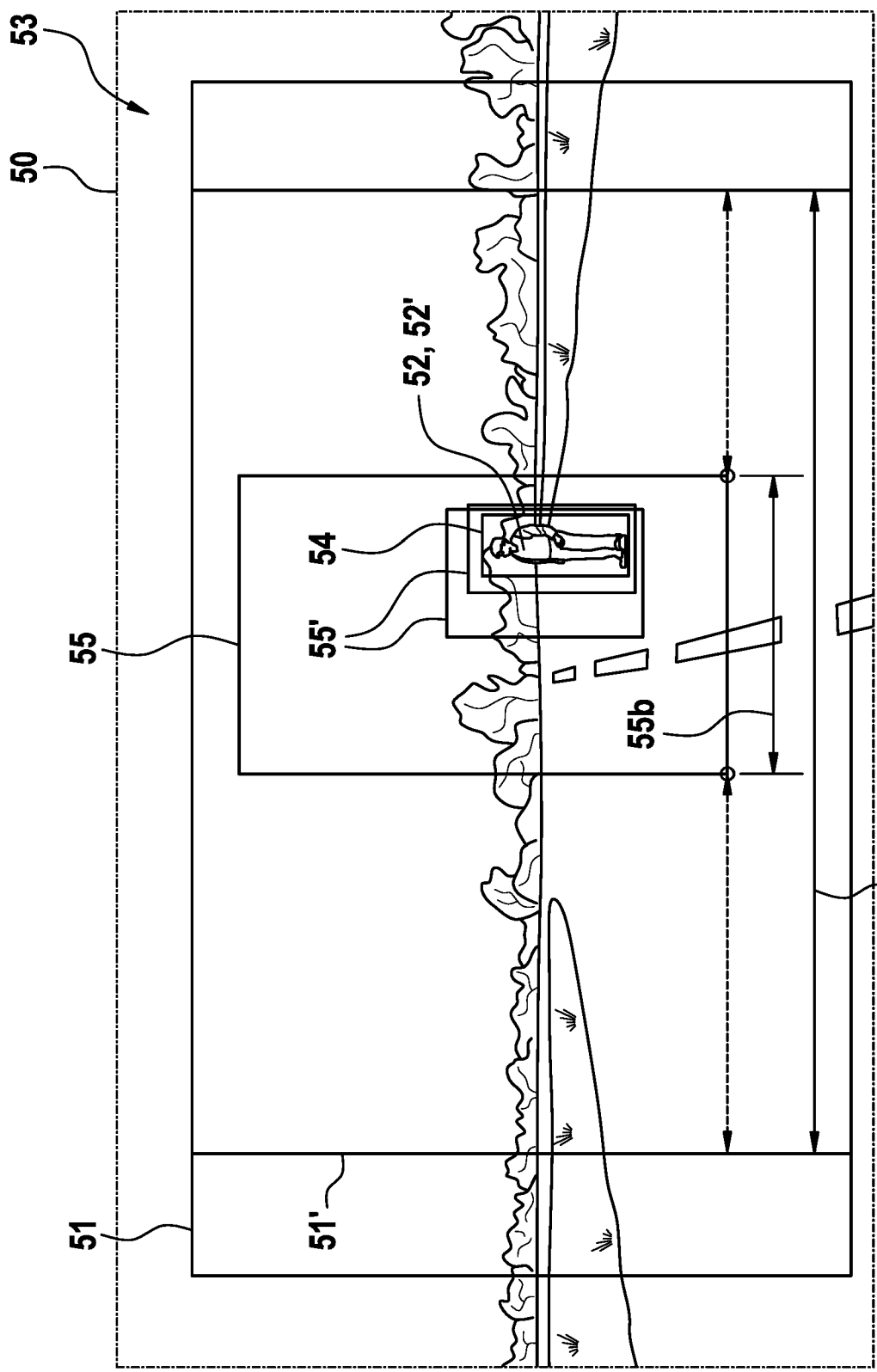
FIGS. 2 through 4 show schematic side views of different scenes in a field of view, which may be evaluated, using the operating assistance method of the present invention.
Figure 3:
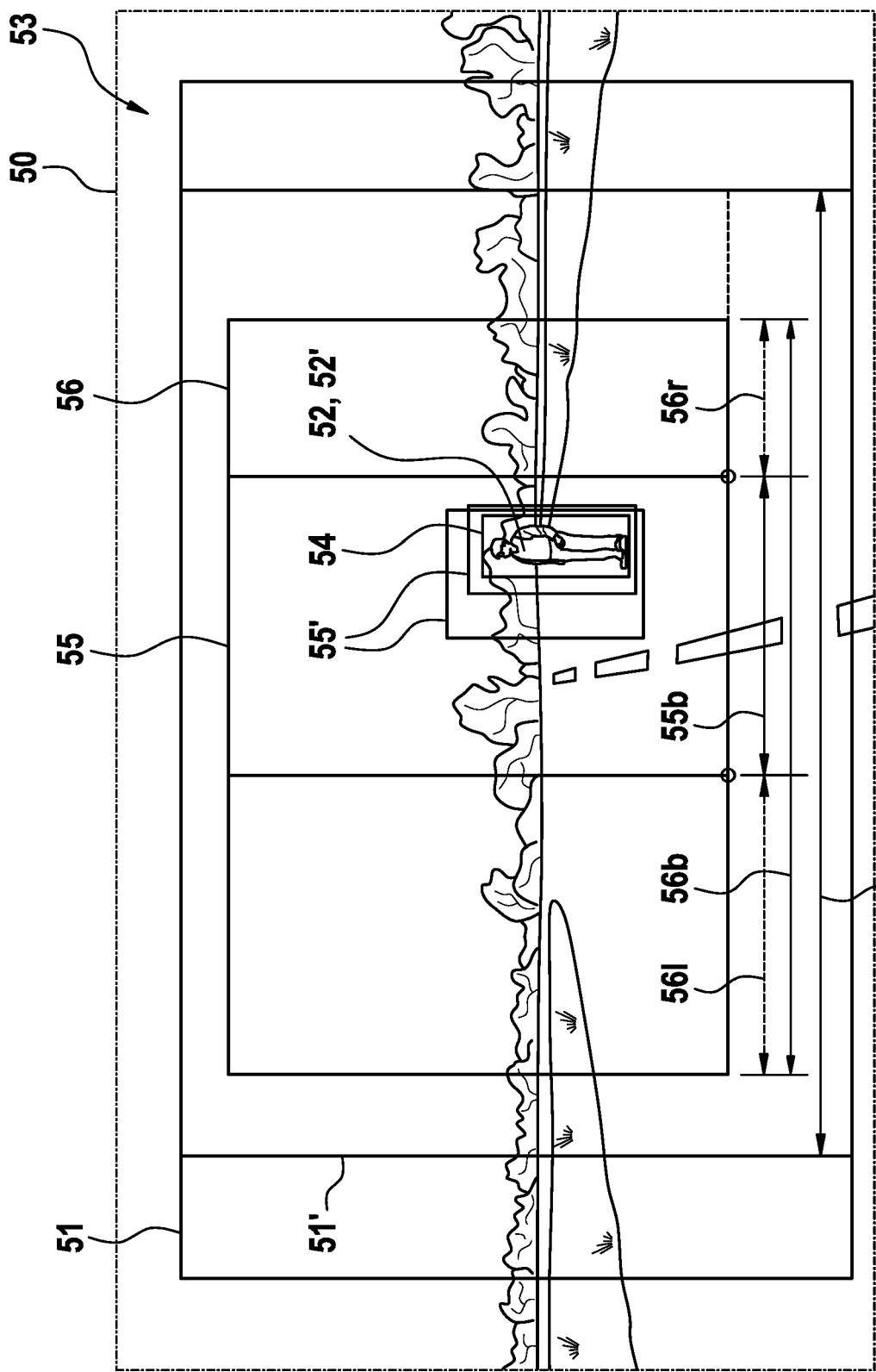
Figure 4:
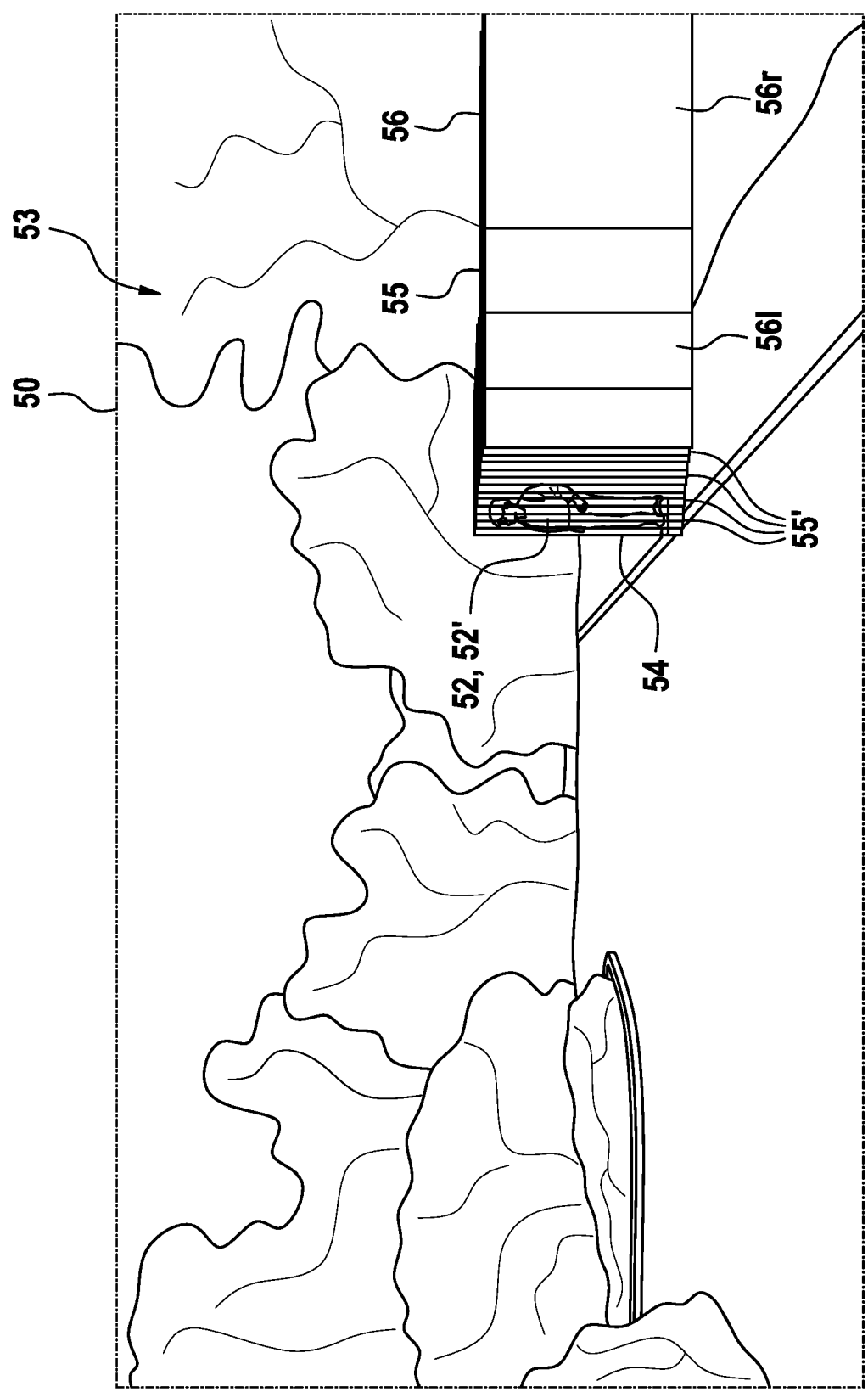

FIGS. 2 through 4 show schematic side views of different scenes 53 in a field of view 50, which may be evaluated, using the operating assistance method S of the present invention.

In the situation represented in FIG. 2, in scene 53, there is a pedestrian 52' in the form of an object 52 in field of view 50, which is imaged in an image or frame 51 by the camera unit 40 shown in FIG. 1. In some instances, image or frame 51 is limited, using a corresponding section or part 51'.

Initially, an object box 54 is derived for pedestrian 52'. In comparison with an object box 54 from a temporally preceding image or frame 51, a scaling change and the degree of displacement or translation of object box 54, angular positions, angular speeds of box edges, and/or variables derived from them are then determined. Then, in the above-described, iterative method I having steps I1 through I5, a prediction with regard to an expected, predicted object box 55 for an elapsed prediction time span may be generated from these variables over a number of time increments. In this manner, the given object box 54 may be extrapolated, with regard to position, into the future for a prediction time span, using the lower right and left corners and width $55b$, to form a predicted object box 55.

Then, for the evaluation, width $55b$ of the object box 55 predicted for the prediction time span in the future is compared to width $51b$ of section 51' of image 51. If their ratio exceeds a predefined, first threshold value, then object 52 is regarded as critical with a criticality of 100%.

This criticality value may already be used, in order to transmit a warning to the user of working device 1 in accordance with the present invention and, in particular, to the driver of vehicle 1', or in order to intervene directly in the operating method of working device 1. However, if object 52 is a pedestrian 52', it is also possible to allow further aspects of object 52, such as a predicted acceleration behavior or the like, to have an influence in a more realistic manner.

To that end, a current speed of pedestrian 52' in the form of object 52, as well as his/her size, may be derived and used as an input parameter of a pedestrian model. The pedestrian model then outputs corresponding values for an expected acceleration or for an expected acceleration behavior. These values may be used, in order to construct a surrounding or enveloping object box 56 as shown in FIGS. 3 and 4; the right and left sections $56r$ and $56l$ of the object box, which extend beyond the originally predicted object box 55, representing regions of uncertainty with regard to a positive or negative acceleration behavior of pedestrian 52' in the form of object 52.

Figure 5:
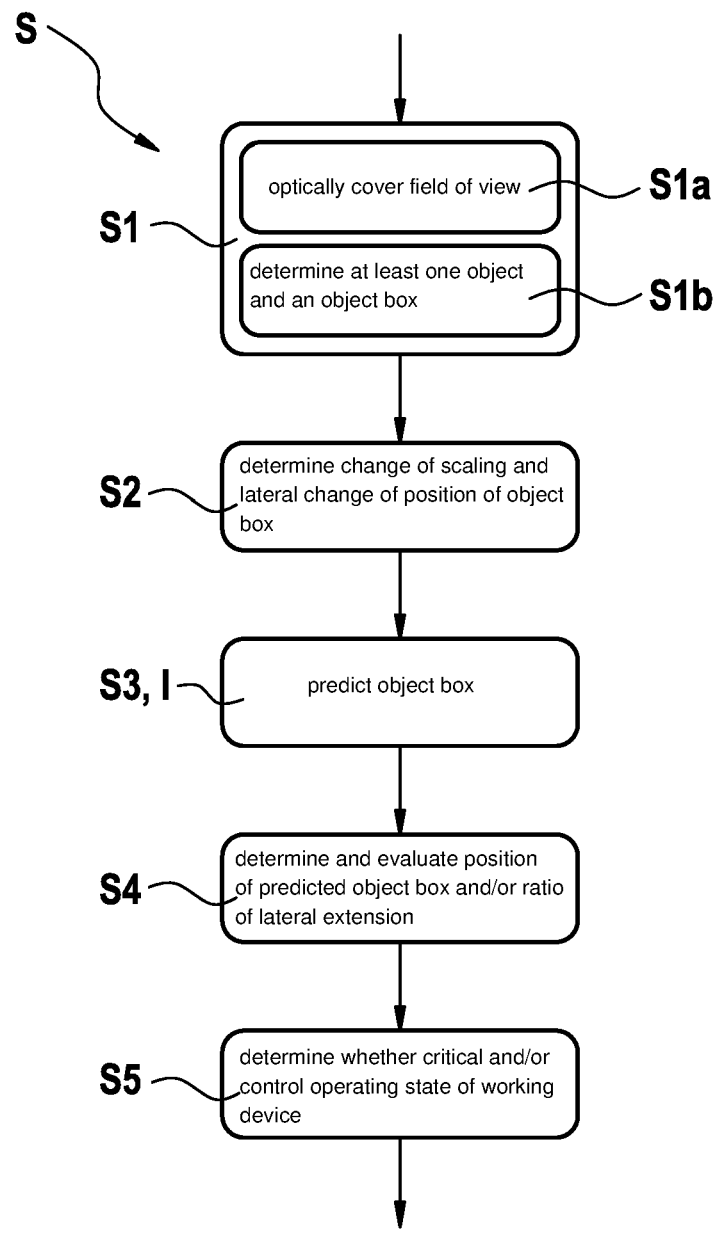
FIGS. 5 and 6 show flow charts of a specific example embodiment of the operating assistance method according to the present invention and/or of the iterative determination of a predicted object box in accordance with the present invention.
Figure 6:
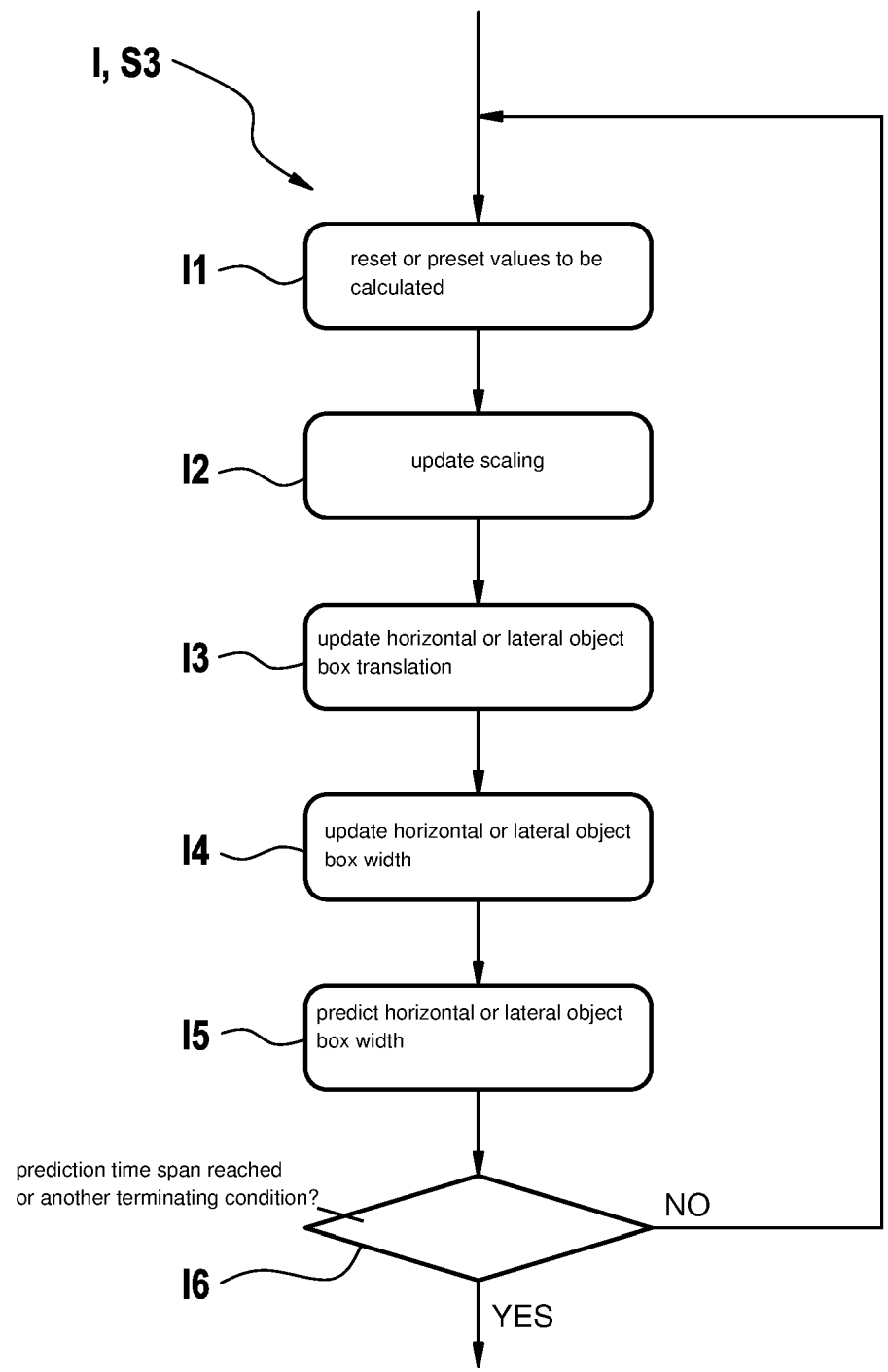

FIGS. 5 and 6 show flow charts of a specific example embodiment of operating assistance method S of the present invention and of the iterative determination I of a predicted object box 55, respectively, as have been already discussed above in connection with the general representation of the present invention.

In this connection, it should still be mentioned that iterative method I essentially forms step S3 of the specific embodiment of operating assistance method S according to the present invention; in step I6, it being checked if the prediction time span has already been reached via the expiration of the time increments, and/or if another terminating condition for the iteration is present.

In this context, an alternative or further termination condition may be seen, for example, in connection with the exceedance of a second threshold value by the width of predicted object box 55 in comparison with the width of image 51 or of section 51'; the second threshold value being greater than the first threshold value.

These and additional features and characteristics of the present invention are elucidated further with the aid of the following explanations:

The present invention provides measures, such as degrees of criticality for a collision warning system, for example, as part of an operating assistance system of a working device and, in particular, of a vehicle, which may be determined solely on the basis of measurement data of a monocular video system.

Collision indicators often used for this include time-to-collision (TTC) and time-to-brake (TTB). These give insight into when a collision will take place and/or when a braking action must be initiated, in order to prevent a collision. Parameters TTB and TTC may be computed reliably on the basis of data of a mono video camera, and primarily from scaling changes of object boxes, and namely, without the necessity of determining distances, relative speeds and relative accelerations.

A further collision indicator is the value, constant bearing (CB), which comes originally from shipping and is an indicator of if one is on a collision course with an object 52 in the case of constant independent motion and constant object motion. The CB may also be computed solely on the basis of mono video data, that is, on the basis of two-dimensional data.

The state of the art for criticality computations is the use of a 3-D-based world coordinate system.

The basis for such a procedure is the use of three-dimensional data or 3-D data, for example, in accordance with distances, relative speeds and relative accelerations, which, using a mono camera or monocular camera, may only be determined at a reduced quality, and by estimation.

The CB concept is difficult to understand, difficult to parameterize, and does not allow prediction in the future and the use of pedestrian movement models.

The concepts TTC/TTB alone are not sufficient for a braking decision, since only the temporal aspect is considered, but not if an object is on a collision course. For example, the concepts TTC and TTB do not provide information as to whether an object is passed.

The new two-dimensional or 2-D-based approach of the present invention for computing criticality is based solely or substantially on measured, two-dimensional or 2-D data or signals and, in particular, on the determination of so-called box coordinates for object boxes, as well as the parameters of the scaling change, the box translation, the angular positions and/or the angular speeds, which describe a change of scale or change of size, and/or a movement or displacement of a specific object box in an image or frame or in the specific section of the image or frame, and which may be present or may be determined, together with the box coordinates, with high signal quality.

The approach of the present invention also includes a forecast, prognosis or prediction in the future, namely, with regard to the position of a specific object box 54 and its size/width or change in size/change in width, and consequently allows the use of pedestrian movement models in accordance with the present invention.

Thus, pedestrian movement models may be used for predicting the location of a pedestrian 52'. In this context, models about the accelerating ability of a pedestrian 52' in different states of motion, for example, standing, going, walking, running, are used in order to make a statement as to where pedestrian 52' could be in the future. The value of criticality is calculated from the overlap of the predicted or prognosticated, separate location and the predicted or prognosticated, possible location 56 of pedestrian 52'.

The approach of the present invention is simpler to understand and to parameterize than the pure CB concept, and an experimental evaluation shows that the approach of the present invention supplies better results than is possible, using CB implementations and conventional 3-D-based methods on the basis of 3-D data estimated with the aid of a mono camera.

In general, a forecast or prediction may be, and is, carried out for each recorded image or frame, as well. In this connection, a target time span of, e.g., 2 seconds is set for each recorded image or frame. Thus, the prediction is made for the target time span in the future. In this context, the target time span is subdivided into a plurality of, for example, equal time increments. However, the target time span and/or the time increments may also be variable and dependent, may be selected, and may be determined by other operating parameters.

In this context, the following processes are carried out for each recorded image 51 or frame:

Acquiring the lateral box coordinates of a specific object box 54 of a given object 52 in field of view 50.

Acquiring the change of scale of object box 54 of an object 52 with regard to one or more preceding images or frames.

Determining the box movement, box displacement or box translation (in pixels), angular positions and/or angular speeds of the box edges of an object box 54 of a given object 52 in field of view 50, in the lateral direction with regard to the preceding image or frame or a part or section of it.

The concrete prediction or prognosis is based on the procedure already described above, using methods S and I for n time increments up to the target time span in the form of the prediction time span.

In each of the n cycles, that is, for each time increment up to the attained, predefined target time span, the predicted box width is compared to the image width of camera image 51 or to the width of a predefined or predetermined part or section 51' of it.

The ratio of the box width in the image and the image width or the width of the section may be taken as a basis for the determination of a measure of the criticality. As soon as box width 55$b$ assumes a certain width 51$b$ of image 51 or of section 51' and therefore exceeds a threshold value of, e.g., 35%, a criticality of 100% is assumed and set.

On the other hand, if the predicted or prognosticated box 55 lies, e.g., partially or completely outside of image 51 or of section 51', the situation is uncritical, and the value of criticality is set to 0%.

With the aid of a pedestrian model, the ability of pedestrian 52' to accelerate may be ascertained as a function of the position and/or speed of him/her. In this context, a second and wider object box 56 for a pedestrian 52' in the form of an object 52 may be generated to include the possible, lateral location of pedestrian 52' within image 51 or section 51' of image 51, in view of his/her ability to accelerate.

To determine the speed of pedestrian 52' as object 52, and to convert the ability to accelerate to pixel or angular coordinates, assumptions about the size of pedestrian 52' as an object 52 may be made. For example, a normal height of 1.75 m may be taken as a basis.

In addition, the value of criticality computed previously may be reduced by the portion, of box 55, which was last predicted or prognosticated and lies outside of image 51 or of the frame and of the specific section 51' or portion of it; or the criticality value may be minimized. For, when object boxes 55 represent the possible location in view of the pedestrian model, if, e.g., 50% of box width 55b lies outside of image 51 or of the frame and/or of the given part or section 51', the criticality is reduced accordingly. The further the prediction lies in the future, the more marked the criticality is reduced, since a large area of location potentially lies outside of image 51 or section 51'. This behavior may be desired, since with increasing temporal prediction in the future, the uncertainty about the behavior of pedestrian 52' increases.

If predicted object box 55 of a pedestrian in the form of object 52 reaches a critical size, e.g., a threshold value of 35% of the frame width or image width, the prediction is aborted in this cycle of iteration I, since a possible collision would have already taken place at this time.

What is claimed is:

1. An operating assistance method for a working device, comprising the following steps:
   (S1) obtaining, at consecutive times, object boxes for an object in a field of view of the working device, or data characterizing the object boxes;
   (S2) from the object boxes of the object for images recorded in succession or direct succession, determining: (i) a change of scaling of an object box for the object, or variables derived from the change of scaling the object box for the object, and (ii) a lateral change of position of the object box for the object;
   (S3) determining a predicted object box, predicted in for the future, from the change of scaling of the object box for the object or the variables derived from the change of scaling of the object box for the object, and from the lateral change in position of the object box for the object;
   (S4) determining and evaluating: (i) a position of the predicted object box and/or (ii) a ratio of a lateral extension of the predicted object box to a lateral extension of: (a) a covered field of view, and/or (b) the recorded images or a section of the recorded images; and
   (S5) as a function of the result of the evaluation, determining: (i) whether or not the object which forms the basis of the predicted object box is classified as having more at least a threshold risk of collision, and/or (ii) an operating state of the working device being controlled or regulated.

2. The operating assistance method as recited in claim 1, wherein in step (S1) includes:
   (S1a) optically covering the field of view of the working device two-dimensionally and/or monocularly, by recording temporally consecutive images; and
   (S1b) in the consecutive, recorded images, determining the object and the object box associated with the object.

3. The operating assistance method as recited in claim 1, wherein the predicted object box is determined for at least an image currently recorded last, by determining and updating iterative values for the scaling of the object box, for coordinates of the object box, for a translation of the object box, and for a lateral width of the object box, over a plurality of time increments up to a prediction time span.

4. The operating assistance method as recited in claim 3, wherein for each of the time increments, the following steps are carried out:

(I1) resetting or presetting values to be calculated, in accordance with the following assignment rules $Scaling_{old} := Scaling_{new}$ $BoxTranslationX_{old} := BoxTranslationX_{new}$ $BoxWidth_{old} := BoxWidth_{new}$ $LeftBoxPosition_{old} := LeftBoxPosition_{new}$ $RightBoxPosition_{old} := RightBoxPosition_{new}$;

(I2) updating the scaling in accordance with the following assignment rule $Scaling_{new} := 1/(2 - Scaling_{old})$ (I3) updating a horizontal translation of the object box in accordance with the following assignment rule $BoxTranslationX_{new} := BoxTranslationX_{old} \times Scaling_{old}$ (I4) updating a horizontal width of the object box in accordance with the following assignment rule $BoxWidth_{new} := RightBoxPosition_{old} - LeftBoxPosition_{old}$ (I5) predicting horizontal box positions of the object object in accordance with the following assignment rules $LeftBoxPosition_{new} := LeftBoxPosition_{old} + BoxTranslationX_{new} - 0.5 \times BoxWidth_{new} \times (Scaling_{new} - 1)/Scaling_{new}$ $RightBoxPosition_{new} := RightBoxPosition_{old} + BoxTranslationX_{new} + 0.5 \times BoxWidth_{new} \times (Scaling_{new} - 1)/Scaling_{new}$;

wherein:
   $Scaling_{old}$ and $Scaling_{new}$ respectively designate an old and new scaling, or values of the old and new scaling, of the object box;
   $BoxTranslationX_{old}$ and $BoxTranslationX_{new}$ respectively designate an old and new displacement, or values of the old and new displacement, of the object box;
   $BoxWidth_{old}$ and $BoxWidth_{new}$ respectively designate an old and new width, or values of the old and new width, of the object box;
   $LeftBoxPosition_{old}$ and $LeftBoxPosition_{new}$ respectively designate an old and new position, or values of the old and new position, of a lower left corner of the object box in the form of a first x-coordinate of the object box; and
   $RightBoxPosition_{old}$ and $RightBoxPosition_{new}$ respectively designate an old and new position, or values of the old and new position, of a lower right corner of the object box in the form of a second x-coordinate of the object box.

5. The operating assistance method as recited in claim 3, wherein the following computational rule is implemented for ascertaining a new box position of the object box:

$LeftBoxPosition_{new} := (LeftBoxPosition_{current} + LeftBoxSpeed_{current} * T_{Prediction})/(1 + NormSpeed_{current} * T_{Prediction})$ $RightBoxPosition_{new} := (RightBoxPosition_{current} + RightBoxSpeed_{current} * T_{Prediction})/(1 + NormSpeed_{current} * T_{Prediction})$;

wherein:
   $LeftBoxPosition_{new}$ and $LeftBoxPosition_{current}$ and $RightBoxPosition_{new}$ and $RightBoxPosition_{current}$ are new and current positions, respectively, of left and right box edges, respectively, of the object box;

$LeftBoxSpeed_{current}$ and $RightBoxSpeed_{current}$ are currently measured angular speeds of the left and right box edges, respectively;

$NormSpeed_{current}$ is a currently measured, normalized box speed of the object box;

$T_{Prediction}$ is a prediction time of step (S4); and wherein $NormSpeed_{current}$ is derived from the determined change of scaling of the object box.

6. The operating assistance method as recited in claim 1, wherein the object forming the basis of the predicted object box is determined to be classified as having at least the threshold risk of collision and to have a value of criticality of 100% when a portion of the a width of the predicted object box, at a width of an underlying image or a predefined section of the underlying image, exceeds a predetermined, first threshold value.

7. The operating assistance method as recited in claim 6, wherein the value of criticality determined for the object is reduced commensurate to a level at which the predicted object box for the object is positioned, in the width of the predicted object box, outside of the underlying image or the predefined section.

8. The operating assistance method as recited in claim 1, wherein the object, which forms the basis of the predicted object box, is determined not to be a risk for collision and to have a value of criticality of 0% when the predicted object box lies completely outside of an underlying image or a predefined section of the underlying image.

9. The operating assistance method as recited in claim 1, wherein the object is a pedestrian, a position and motion of the pedestrian in the form of the object are checked and evaluated based on a pedestrian model, an ability of the pedestrian to accelerate is determined based on a speed ascertained for the pedestrian, a risk of the pedestrian, in the form of the object, with respect to the collision is determined based on the speed and the ability to accelerate, and an object box enveloping the predicted object box or at least laterally or horizontally surrounding the object box is generated based on the ability to accelerate and taken as a basis for the determination of the risk of the pedestrian with respect to the collision.

10. The method as recited in claim 1, further comprising: protecting pedestrians, and/or cyclists based on results of step (S5).

11. The method as reciting in claim 1, further comprising: using results of step (S5) for ACC and/or for collision avoidance systems.

12. A control unit for an operating assistance system of a working device, configured to:
(S1) obtain, at consecutive times, object boxes for an object in a field of view of the working device, or data characterizing the object boxes;
(S2) from the object boxes of the object for images recorded in succession or direct succession, determine: (i) a change of scaling of an object box for the object, or variables derived from the change of scaling the object box for the object, and (ii) a lateral change of position of the object box for the object;
(S3) determine a predicted object box, predicted in for the future, from the change of scaling of the object box for the object or the variables derived from the change of scaling of the object box for the object, and from the lateral change in position of the object box for the object;
(S4) determine and evaluate: (i) a position of the predicted object box and/or (ii) a ratio of a lateral extension of the predicted object box to a lateral extension of: (a) a covered field of view, and/or (b) the recorded images or a section of the recorded images; and
(S5) as a function of the result of the evaluation, determine: (i) whether or not the object which forms the basis of the predicted object box is classified as having more at least a threshold risk of collision, and/or (ii) an operating state of the working device being controlled or regulated.

13. The control unit as recited in claim 12, wherein the working device is a vehicle.

14. An operating assistance system for a working device, comprising:
a control unit for an operating assistance system of a working device, configured to:
(S1) obtain, at consecutive times, object boxes for an object in a field of view of the working device, or data characterizing the object boxes;
(S2) from the object boxes of the object for images recorded in succession or direct succession, determine: (i) a change of scaling of an object box for the object, or variables derived from the change of scaling the object box for the object, and (ii) a lateral change of position of the object box for the object;
(S3) determine a predicted object box, predicted in for the future, from the change of scaling of the object box for the object or the variables derived from the change of scaling of the object box for the object, and from the lateral change in position of the object box for the object;
(S4) determine and evaluate: (i) a position of the predicted object box and/or (ii) a ratio of a lateral extension of the predicted object box to a lateral extension of: (a) a covered field of view, and/or (b) the recorded images or a section of the recorded images; and
(S5) as a function of the result of the evaluation, determine: (i) whether or not the object which forms the basis of the predicted object box is classified as having more at least a threshold risk of collision, and/or (ii) an operating state of the working device being controlled or regulated; and a camera configured to record the images.

15. The operating assistance system as recited in claim 14, wherein the working device is a vehicle.

16. The operating assistance system, as recited in claim 14, wherein the vehicle is a motor vehicle or a passenger car.

* * * * *